United States Patent
Farawila

(10) Patent No.: US 6,298,108 B1
(45) Date of Patent: *Oct. 2, 2001

(54) NUCLEAR FUEL ROD WITH UPWARD-SHIFTED PELLET STACK AND A DEVICE TO REALIZE SAME

(76) Inventor: Yousef M. Farawila, 1900 Stevens Dr. 811, Richland, WA (US) 99352

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,744

(22) Filed: Jul. 21, 1999

(51) Int. Cl.$^7$ ........................................ G21C 3/18
(52) U.S. Cl. .................. 376/420; 376/412; 376/418; 376/428; 376/445
(58) Field of Search ................... 376/412, 420, 376/425, 413, 418, 428, 445

(56) References Cited

U.S. PATENT DOCUMENTS

| | | | | |
|---|---|---|---|---|
| 3,310,474 | * | 3/1967 | Saunders | 176/76 |
| 3,378,458 | * | 4/1968 | Ross et al. | 176/79 |
| 3,406,090 | * | 10/1968 | Dunn et al. | 176/73 |
| 3,625,823 | * | 12/1971 | Kerr | 176/79 |
| 3,647,622 | * | 3/1972 | Andrews et al. | 176/68 |
| 3,647,623 | * | 3/1972 | Hepps et al. | 176/68 |
| 3,671,393 | * | 6/1972 | Williams | 176/73 |
| 3,679,545 | * | 7/1972 | Leirvik | 176/68 |
| 3,996,100 | * | 12/1976 | Oguma et al. | 176/68 |
| 4,036,691 | * | 7/1977 | Meadowcroft et al. | 176/68 |
| 4,111,748 | * | 9/1978 | Hayashi et al. | 376/412 |
| 4,123,326 | * | 10/1978 | Shinbo | 176/68 |
| 4,257,847 | * | 3/1981 | Gibby et al. | 176/68 |
| 4,557,892 | * | 12/1985 | Komada | 376/412 |
| 4,596,690 | * | 6/1986 | Kadambi et al. | 376/418 |
| 4,642,217 | * | 2/1987 | Wilson et al. | 376/451 |
| 4,678,924 | * | 7/1987 | Loriot et al. | 29/407 |

FOREIGN PATENT DOCUMENTS

| | | | | |
|---|---|---|---|---|
| 0514121 A1 | * | 11/1992 | (EP) | G21C/3/16 |
| 43-18508 | * | 8/1968 | (JP) . | |
| JO 1176978 | * | 7/1989 | (JP) | G21C/3/18 |

* cited by examiner

Primary Examiner—Michael J. Carone
Assistant Examiner—John Richardson
(74) Attorney, Agent, or Firm—Liebler, Ivey & Connor; Floyd E. Ivey

(57) ABSTRACT

A new design concept of boiling water reactor fuel rod is disclosed. The new design is characterized by an upward shift in the location of the fuel pellet stack inside the fuel cladding. The resulting axial power shift upward decreases two-phase and total pressure drop and has a stabilizing effect. A device for affecting such fuel pellet displacement is a crushable tube placed under the fuel pellet stack, which also helps to mitigate fuel-clad mechanical interaction and reduces the likelihood of clad failure.

3 Claims, 4 Drawing Sheets

Figure (1)
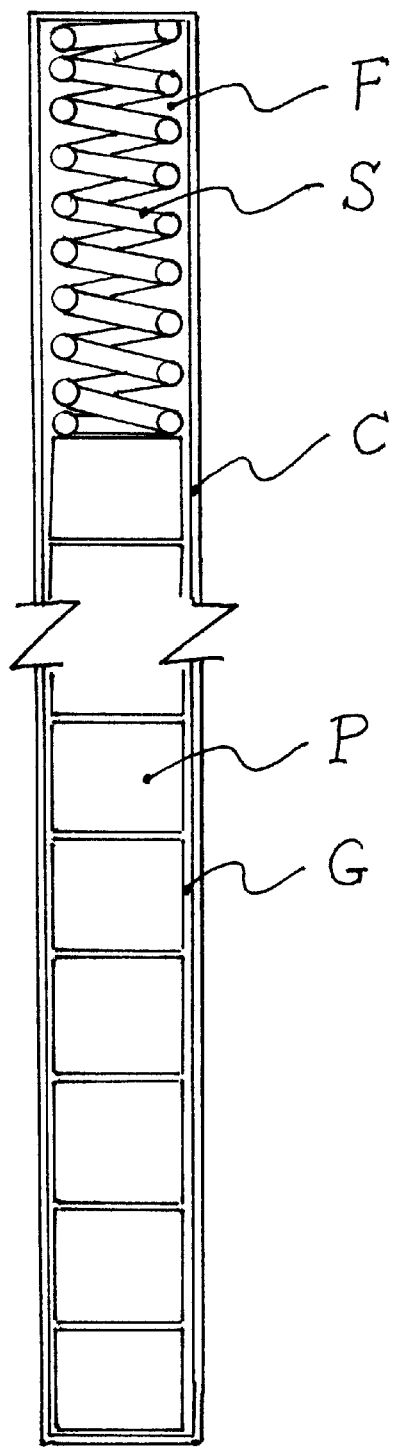

Figure (2)
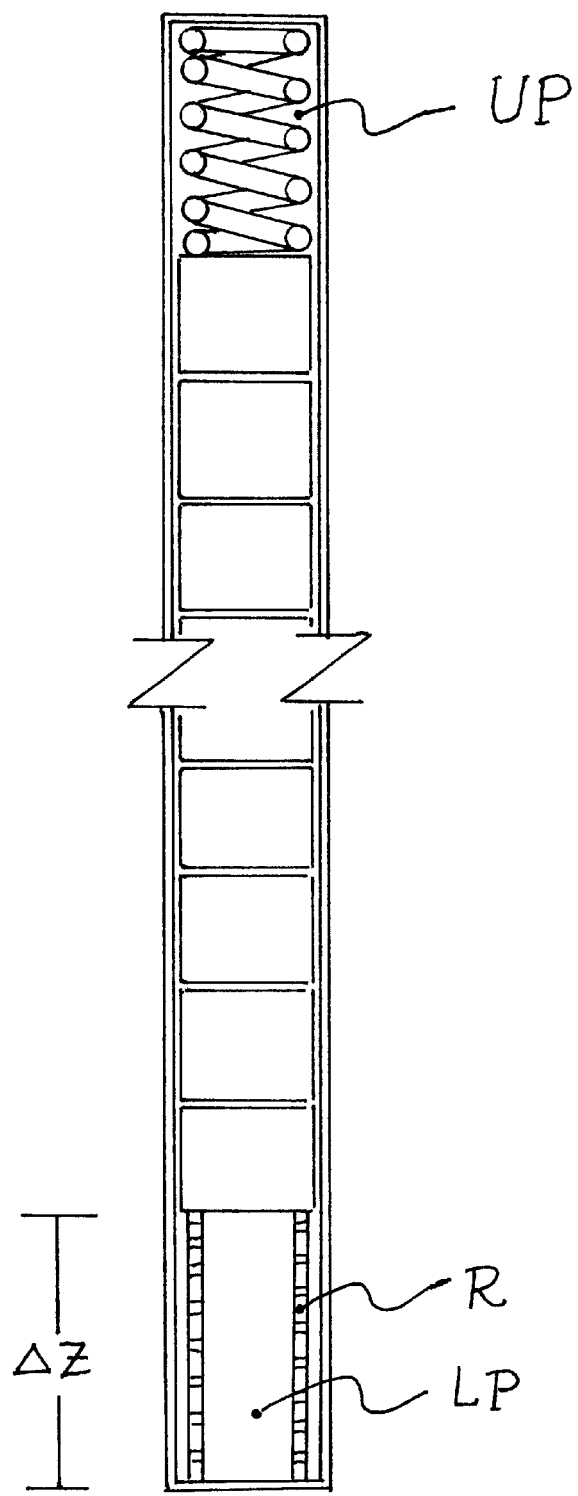

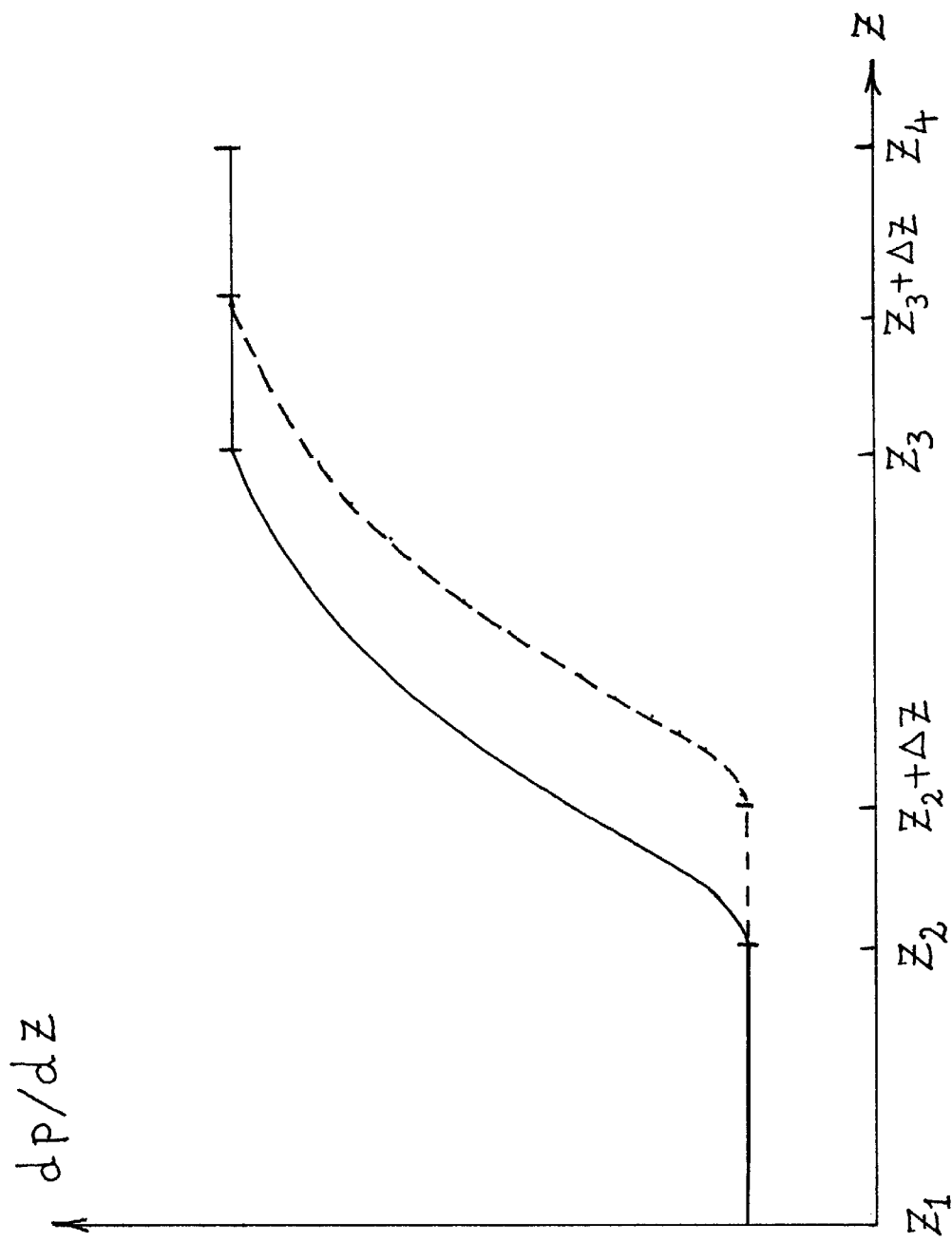
Figure (3)

Figure (4)
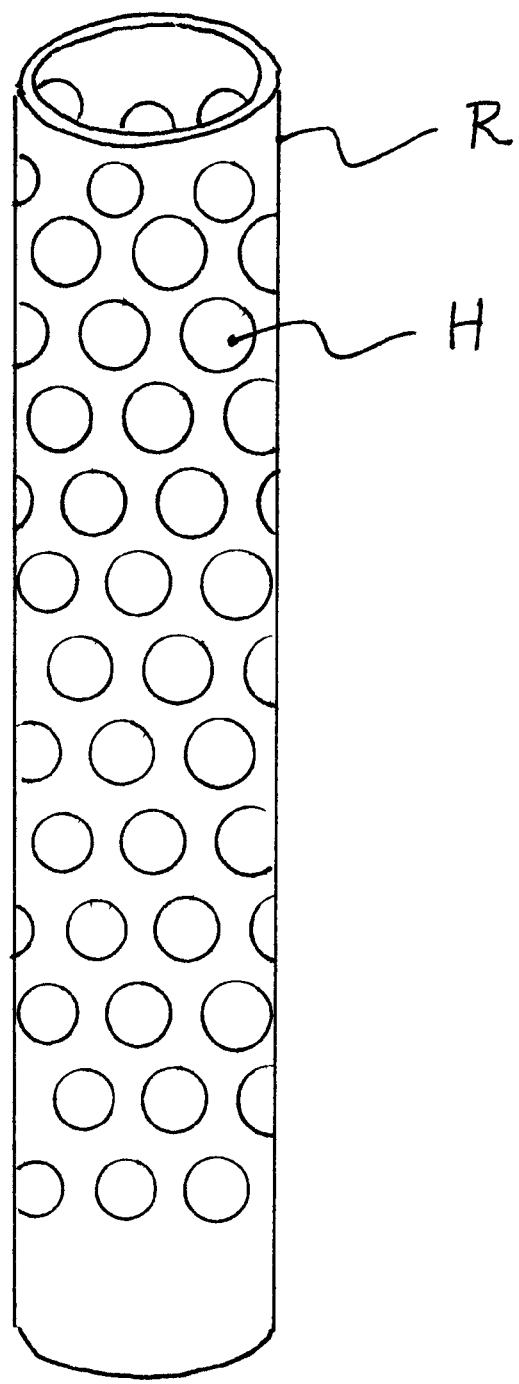

NUCLEAR FUEL ROD WITH UPWARD-SHIFTED PELLET STACK AND A DEVICE TO REALIZE SAME

FIELD OF THE INVENTION

The present invention relates to nuclear fuel assemblies for boiling water reactors (BWR). More specifically, a new design concept for the fuel rods is disclosed for improving the fuel performance in said reactors.

BACKGROUND OF THE INVENTION

Boiling Water Reactors (BWR) designed for power generation utilize fuel assemblies arranged inside vertical channels through which water coolant is injected. Each of the fuel assemblies consist of a plurality of vertical rods arrayed within the said vertical channels. The said rods, henceforth called "fuel rods" are sealed cylindrical tubes inside which ceramic pellets of fissionable material, e.g. uranium oxide, are stacked. The fuel pellet stack rests on the bottom of the fuel rod tube and held down on the top by a compressed spring. The space above the fuel pellet stack where the spring is placed is called the fission gas plenum. The fuel rods are initially filled,with an inert gas at relatively low pressure, and the pressure inside the rod increases as the fission-produced gasses accumulate throughout the life time of the fuel.

The fuel rods are arrayed in a lattice of fixed dimensions. The position of each rod is held in the lattice by an upper and lower tie plates. To prevent fuel rod bowing and to hold the fuel rods in the lattice positions at all elevations, several so-called spacers are placed at nearly equally-spaced intervals along the length of the assembly. The water flows upward in the channels and removes the heat generated in the pellets by the fissioning of the heavy isotopes. In addition to its cooling function, the water serves as neutron moderator.

In boiling water reactors, the water is allowed to boil as it travels up in the fuel assembly channel. The density of water is reduced by the boiling process which results in adverse effects on both the neutronic and the thermal-hydraulic performance of the fuel assembly. The coolant boiling adverse impact on the neutronic performance is a result of the reduced neutron moderation efficiency particularly in the upper portion of the fuel assembly, where the fuel-to-moderator ratio becomes higher than optimally desired. This problem is usually mitigated by introducing one or more water rods or channels through which water flows without boiling and acts to improve neutron moderation.

The thermal-hydraulic performance is affected by the boiling of the coolant because the pressure drop for a flowing mixture of steam and water is significantly higher than the pressure drop for the same mass flow rate of liquid water. The ratio of the pressure drop of flowing steam/water mixture to the pressure drop of the same flow rate of liquid water is the well known two-phase pressure loss multiplier, henceforth called "2-$\phi$ multiplier." It is common to have 2-$\phi$ multiplier of 5~10 signifying large pressure drop due to boiling in the fuel assembly channel.

Modern designs of BWR fuel assemblies utilize a larger number of fuel rods compared with the early designs; a trend motivated by a variety of neutron economy and operational flexibility issues the discussion of which is beyond the scope of this document and is well-known to the practitioners of the art. The early fuel assembly designs consists of fuel rods arrayed in a 7×7 lattice. Subsequent designs utilize 8×8 and 9×9 lattices. Present designs use 10×10 fuel rod arrays and further increase in the number of fuel rods is anticipated. The increase in the number of fuel rods necessitates a decrease in the diameter of each rod and a decrease in the distance between rods in the lattice (known as rod pitch). As a result of the decrease in rod diameters and pitch, the dimensions of the so-called subchannels are similarly decreased. A subchannel is the cross sectional area of the flow domain surrounded by four rods, or rods and cold wall surface. The decrease of the subchannel dimensions can be equivalently expressed as a decrease in the so-called hydraulic equivalent diameter, henceforth called "hydraulic diameter." The hydraulic diameter is defined as four times the total flow area divided by the wetted perimeter. While fuel designers kept the change in flow area relatively small when the number of fuel rods is increased, the wetted perimeter is increased significantly resulting in a net decrease in the hydraulic diameter. It is well-known that the pressure drop for flow through a fuel assembly increases with the decrease of the hydraulic diameter. This increase in the 2-$\phi$ pressure drop for modern designs of fuel assemblies poses undesirable limitations on the maximum flow through a fuel assembly given a fixed pumping power.

The increase in 2-$\phi$ pressure drop of a fuel assembly design poses serious limitations on the stable operation of a BWR containing such fuel assemblies. It is well-known that the margin to instability is reduced when the ratio between the two-phase pressure drop to single-phase pressure drop increases.

The boiling in the BWR fuel assembly is a fundamental aspect of the operation of the power plant, and cannot in itself be reduced to produce favorable outcome. The reduction of the pressure drop resulting from such boiling is a much needed improvement. Such pressure drop reduction was achieved in a limited way in the prior art by using alternate designs and materials for the spacers in an effort to reduce their flow blocking effect. The spacer design impact on the total 2-$\phi$ pressure drop is limited because the 2-$\phi$ pressure drop is dominated by the friction in the bare fuel rod region.

The present invention introduces a totally different method and apparatus to achieve the desirable reduction of the 2-$\phi$ pressure drop by introducing design changes in the fuel rods themselves as explained in the following sections.

BRIEF SUMMARY OF THE INVENTION

In accordance with the present invention, a new design concept of the fuel rods is introduced for the purpose of optimizing the pressure drop distribution along the coolant flow path, particularly by reducing the 2-$\phi$ component in the top section of the fuel assembly. This is achieved by the new design where the pellet stack is shifted upward creating two gas plena: one on the top of the fuel rod, and the other on the bottom of the fuel rod. The affected pellet stack displacement shifts the axial power upward thus reducing the total pressure drop and the 2-$\phi$ pressure drop along the coolant flow path while preserving all the neutronic characteristics of the fuel. The benefits claimed from this design are explained in latter sections. The preferred embodiment of the invention is by using a crushable tube to support the bottom of the fuel pellet stack. This crushable property improves the likelihood of the fuel clad to survive transient with mechanical pellet/clad mechanical interaction.

BRIEF DESCRIPTION OF THE DRAWINGS

FIG. (1) is a sketch of the axial elevational cross sectional view of a typical fuel rod of the prior art. The rod contains a stack of fuel pellets and a compressed spring in the top section.

FIG. (2) is a sketch of the axial elevational cross sectional view of the new fuel rod of this invention. The rod contains a stack of fuel pellets and a compressed spring in the top section, and a crushable tube placed under the fuel pellet stack. The fuel pellet stack is shifted upward creating two fission gas plena at both ends.

FIG. (3) represents the axial variation of the pressure drop rate along the length of a fuel assembly. The solid line refers to the prior art, and the dash line refers to the new invention.

FIG. (4) is an isometric view sketch of the crushable tube showing holes that weaken the structure to allow the desired crushing under loads exceeding certain design magnitude.

The Figures are not drawn to exact scale or proportion for the purpose of better illustration.

DETAILED DESCRIPTION OF THE INVENTION

A sketch of the fuel rod of prior art is shown in FIG. (1), where the following three components are marked. The first component is the sealed cylindrical tube (C) called the "clad" which is made of a material with low neutron absorption cross section such as a Zirconium-based alloy. The second component is a stack of cylindrical pellets (P) containing the fissionable matter in ceramic form. The stack of pellets rests on the bottom of the cladding tube (C) and is held down by a compressed spring (S), which makes the third component. The space atop the stack where the fission gas accumulates is called the fission gas plenum which is marked on FIG. (1) as (F). The clearance (G) between the pellets and the clad is called the "gap." The approximate length of the fuel rod is 4 m, and its diameter is approximately 1 cm. The height of the pellet stack is approximately 3.7 m, which leaves a height of approximately 30 cm for the gas plenum.

In contrast with the fuel rod of the prior art, a sketch of the new invention is shown in FIG. (2) and illustrated herein. A crushable support tube (R) is placed under the pellet stack thus shifting the stack to a higher elevation. The exact length of the crushable support tube (R) can be varied as a design parameter, and is shown in FIG. (2) as approximately 15 cm. The placement of the crushable support tube (R) creates a new space for fission gas accumulation defined as the "lower plenum" (LP). The space atop the pellet stack, called the "upper plenum" (UP) is reduced compared with the space (F) shown in FIG. (1). The total volume of the two plena (LP) and (UP) shown in FIG. (2) remains approximately similar to the prior art gas volume (F) shown in FIG. (1) which can accommodate the same amount of fission gas release.

The length of the crushable tube is $\Delta Z$, which is also the pellet stack displacement length. At any time in the fuel cycle, the fission power generated in the pellets has a fixed shape as a function of the axial position of the pellets relative to the bottom-most pellet. When the pellet stack is shifted upward by $\Delta Z$, the axial power shape in the assembly is similarly shifted upward by $\Delta Z$ relative to the reference coolant entry point at the bottom of the assembly. The resulting change in the characteristics of the pressure drop shift is shown in FIG. (3). The rate of pressure drop, dp/dZ, is plotted as a function of the elevation Z along the length of the assembly. Three distinct zones are discernible. The first zone is the single phase zone $Z_1$ to $Z_2$ where the pressure drop rate is constant and relatively small. The second zone spans the length between $Z_2$ and $Z_3$ where the pressure drop rate monotonically increases with elevation, as the steam content increases by energy addition to the flowing coolant. The third zone which spans the length between $Z_3$ and $Z_4$ is characterized by pressure drop rate of relatively high but constant magnitude, as the said span does not contain any pellets and the steam content in the flowing coolant remains constant. The pressure drop rate is shown for the prior art fuel rod by a solid line in FIG. (3). With the shifted pellets and the axial power shape, the elevation at the onset of boiling, called the boiling boundary, is shifted to $Z_2+\Delta Z$. The elevation marking the end of the heated length $Z_3$ is similarly shifted to $Z_3+\Delta Z$. The location of the top of the fuel rod $Z_4$ remains unchanged. The pressure drop rate along the assembly with rods of the new design is marked in FIG. (3) by the dash line.

The total pressure drop $\Delta p$ is the integration of the pressure drop rate with respect to the assembly length Z according to the equation $$\Delta p = \int_{Z_1}^{Z_4} \frac{dp}{dZ} dZ.$$

It is obvious that the total pressure drop is the area under the pressure drop rate curve, which results in concluding that $$\Delta p(\text{new}) < \Delta p(\text{old}),$$

where $\Delta p(\text{new})$ and $\Delta p(\text{old})$ are the pressure drop of the new design and the prior art design respectively.

The reduction in the total and 2-$\phi$ pressure drop with the upward shift of the boiling boundary is one of the important objectives of this invention. The total pressure drop reduction allows useful design changes which have the side effect of inadvertently increasing the pressure drop. Examples of such design changes are 1. The use of larger diameter fuel rods containing more fissionable material.

2. Allow more spacers to be used particularly in the top section of the assembly, where the flow mixing effect of the spacer increases pressure drop but also improves the critical power performance against dryout.

3. Allow the reduction of the number of part-length fuel rods, or mitigate the need to increase same, which are used to reduce the 2-$\phi$ pressure drop at the expense of reducing the mass of the fissionable material.

4. Allow using higher pressure drop inlet piece (such as lower tie plate) with the effect of substantial decrease in the 2-$\phi$ pressure drop relative to the single phase pressure drop resulting in increasing the safety margin against density wave instabilities and more reactor operational flexibility.

5. Allows higher flow rates for the new fuel assembly which decreases the steam content in the boiling section of the flow and increases the neutron moderation efficiency and the neutron economy of the fuel assembly. This allows using lower U-235 enrichment and reduces the cost of the fuel assembly.

It must be noted that the spacer locations needed to support the fuel rods against rod bow and seismic loads need not be changed due to the use of the new fuel rod design with upward-shifted pellet stack. The axial power shape is thus shifted relative to the spacer locations. Critical heat flux causing dryout occurs immediately under a spacer as it is the largest distance away from the next spacer below. This is explained as due to the spacer flow mixing effect which increases the critical heat flux, and such effect decays as the fluid travels away from the spacer. Thus, shifting the top spacer down to a lower elevation where the power is higher would help with increasing the critical power. However, the spacer location must not be shifted physically so that its mechanical support function is not adversely affected. A relative shift of the spacer location is produced by shifting the axial power shape instead. Therefore, the new invention results in improving the critical power performance of the fuel assembly without the need to increase the number of spacers. This does not preclude the increase of the number of spacers as mentioned above as a possible means to increase critical heat flux.

The device for affecting the pellet stack shift is a crushable tube placed under the fuel pellet stack. While any method for supporting the fuel pellet stack produces the same pressure drop advantages of this invention, the crushable tube offers important advantages. As the fissionable material is consumed under irradiation, the fuel pellets undergo physical changes such as swelling due to accumulation of fission gas in the porous ceramic material. The pellet may also crack due to these irradiation effects and thermal stresses. The aforementioned physical changes in the pellet result in closing the small gap between the pellet and the clad, which is called pellet-clad mechanical interaction which prevents the pellet from sliding freely relative to the clad. Under unanticipated power transients, which may result in large differential thermal expansion of the pellets relative to the clad, the clad section between the bottom of the fuel rod and the first pellet experiencing pellet-clad interaction comes under large mechanical stress resulting in possible clad failure and the release of radioactive-fission products into the coolant stream. The use of the crushable tube of this invention allows the expansion of the fuel pellet stack under these severe conditions by crushing the tube and relieving the mechanical stress thus avoiding clad failure. The threshold crushing force required to compress the crushable tube must be designed to be larger than the weight of the pellet stack plus the compression force of the spring located in the upper gas plenum. The same crushing force must be lower than the minimum force required to cause clad failure.

A sketch of the preferred embodiment of the crushable tube is shown in FIG. (4). In the said sketch, the tube (R) has a cylindrical cross section with outer diameter slightly smaller than the inner diameter of the cladding tube. The wall of the crushable tube is perforated at several places to make holes (H) which serve to weaken the structure of the tube and allow the crushing desired to occur above a certain design stress. The material removed by the perforation allows a larger volume for the lower plenum which is desired for accommodating fission gas released by the fuel pellets.

What is claimed is:

1. A nuclear fuel rod design with the fissionable material pellet stack comprising a perforated tube crushable along a tube longitudinal axis corresponding to a longitudinal axis of the fuel rod and placed at the bottom of the fuel pellet stack.

2. The invention of claim 1 further comprising the perforated tube has a plurality of perforations.

3. The invention of claim 1 further comprising: the perforated tube shifting the fissionable material pellet stack upward, by at least 15 cm, relative to the cladding tube, thus shifting the coolant pressure drop upwards; the coolant pressure drop thus modified stabilizes the coolant flow against density wave oscillations.

* * * * *